United States Patent [19]

Van Doren, Jr.

[11] 4,010,285
[45] Mar. 1, 1977

[54] CONCENTRATES FOR CARBONATED SOFT DRINKS

[75] Inventor: George A. Van Doren, Jr., Dallas, Tex.

[73] Assignee: Fred M. Van Doren, Minneapolis, Minn. ; a part interest

[22] Filed: Mar. 25, 1976

[21] Appl. No.: 670,126

Related U.S. Application Data

[63] Continuation-in-part of Ser. No. 490,914, July 22, 1974, abandoned, which is a continuation-in-part of Ser. No. 384,698, Aug. 1, 1973, abandoned.

[52] U.S. Cl. .............................. 426/534; 426/548; 426/590; 426/477; 426/536; 426/537
[51] Int. Cl.$^2$ .......................................... C02D 1/02
[58] Field of Search .......... 426/191, 166, 217, 365, 426/366, 190, 534, 548, 590, 591, 477

[56] References Cited

UNITED STATES PATENTS

| | | | |
|---|---|---|---|
| 3,061,445 | 10/1962 | Stanish | 426/591 X |
| 3,241,977 | 3/1966 | Mitchell et al. | 426/191 X |
| 3,416,930 | 12/1968 | Irani | 426/191 X |
| 3,432,305 | 3/1969 | Kuhr et al. | 426/548 X |
| 3,489,572 | 1/1970 | Kracauer | 426/591 X |
| 3,677,770 | 7/1972 | Witzel | 426/217 X |
| 3,687,684 | 8/1972 | Wentworth et al. | 426/477 X |

OTHER PUBLICATIONS

Furia; Handbook of Food Additives; 1968 by the Chemical Rubber Co., pp. 523–526, 533, 582.
Monsanto Co., "Non–Nutritive Sweeteners for Low–Calorie Food & Beverages"; 1966; pp. 5, 18, 19.
Federal Register Oct. 21, 1962; Title 21–Chapt. 1–Subchapt. B–Part 121–Subpart B.

*Primary Examiner*—S. Leon Bashore
*Assistant Examiner*—Kenneth M. Schor
*Attorney, Agent, or Firm*—Orrin M. Haugen

[57] ABSTRACT

Aqueous base soft drink concentrate formulations of various strengths consisting of flavoring and coloring, an artificial sweetener selected from the group consisting of saccharin, or sodium saccharin, and up to about 50% of total sweetener in the form of sugar, depending on strength of the concentrate, along with a preservative, and from more than 1 up to about 7 volumes of carbon dioxide per volume of concentrate. The carbonated concentrates are utilized to prepare a palatable carbonated soft drink by mixing one part of concentrate to from 1 to 5 parts of ice water, depending on strength of the concentrate formulation.

3 Claims, 1 Drawing Figure

4,010,285

CONCENTRATES FOR CARBONATED SOFT DRINKS

CROSS-REFERENCE TO RELATED APPLICATIONS

This is a continuation-in-part application of Ser. No. 490,914, filed July 22, 1974, entitled "METHOD OF MAKING CARBONATED DIET SOFT DRINKS" and now abandoned, which application was a continuation-in-part application of Ser. No. 384,698, filed Aug. 1, 1973 and entitled "METHOD OF MAKING DIET SOFT DRINKS", now abandoned.

BACKGROUND OF THE INVENTION

The present invention relates generally to an improved aqueous base soft drink concentrate formulation, and more particularly to such a formulation which is particularly adapted for retention of carbon dioxide. The present invention renders it possible to assist in aiding ecology and preserving the environment by reducing solid waste caused from discarded non-returnable soft drink bottles. The present arrangement provides a concentrate which can be utilized by the consumer to mix with water such as ice water to prepare a palatable carbonated drink. In order to render it possible to have a concentrate which will receive heavy volumes of $CO_2$, the sweetener is provided in the form of saccharin or sodium saccharin, and only up to about 50% of total sweetener in the form of sugar. Sugar reduces the amount of carbon dioxide that the system will receive and retain under conditions attainable with conventional bottling equipment and containers. The capability of retaining dissolved carbon dioxide is sufficient to permit the carbonated concentrate to be mixed with substantial quantities of ice water, such as, for example, from 1 to about 5 volumes of ice water per volume of concentrate.

The base concentrates contain dissolved carbon dioxide in large quantities, and are capable of retaining this dissolved carbon dioxide because of the artificial sweetener being up to 100% of total sweetener present. In the past, ordinary sugar has been employed for preparing soft drink concentrates, however with conventional quantities of sugar required for preparing a meaningful concentrate, insufficient carbon dioxide was retained, hence the systems were not compatible for the preparation of a carbonated concentrate utilized in preparing a carbonated soft drink with adequate quantities of carbon dioxide present. In normal sugar-base soft drinks, one pound of sugar is utilized per gallon of finished product. For relating quantities of sweetener required to be equivalent to sugar-base product, one pound of saccharin has the equivalent sweetening capability of approximately greater than 400 pounds of sugar.

Conventional flavorings and colorings are employed for providing the flavor and color desired, and in addition to the artificial sweeteners, sodium chloride, sodium gluconate, glucona delta lactone is added along with citric acid and sodium citrate, as flavoring and buffering ingredients. To this system, water and $CO_2$ are added and a suitable carbonated concentrate is available having a pH of from between about 3 and 6. Under normal conditions, the carbon dioxide will remain in the concentrate, particularly when the concentrate is chilled. Upon exposure to the ambient, only modest quantities of carbon dioxide are lost, with the balance being retained in the soft drink being prepared. For retention of carbon dioxide, it is preferred that a glass of ice water be employed to receive the carbonated concentrate in order to prepare the soft drink from the concentrate. The product is economical for the consumer to utilize and can be packaged or bottled in conventional readily available non-returnable soft drink bottles. The pressure achieved by virtue of the loading with carbon dioxide is not so great so as to prevent utilization of conventional bottles. It has been learned that a 4-strength all sugar sweetened concentrate has a brix of approximately 40, with this providing a material which will not readily receive high quantities of carbon dioxide. A single-strength soft drink normally contains sufficient sugar to provide a brix of approximately 10.

It has also been learned that in attempting to bottle a 4-strength concentrate containing over 20 brix on conventional bottling equipment with maximum allowable pressures of 70 pounds per square inch, the product will normally extrude or otherwise blow out of the bottle or container between the filler and the capper. The reason for this is the high sugar content which prevents absorption of carbon dioxide.

The present-day bottling equipment is designed to carbonate the finished product and fill the bottles with a finished product. Present-day equipment makes it mandatory that the composition of the aqueous solution be compatible with temperature and carbon dioxide pressure of the carbonator.

If the sugar solids are any amount greater than a brix of approximately 20, it will not accept sufficient carbon dioxide so as to permit high quantities desired for a carbonated concentrate. 20 brix is only sufficient sweetener for a double-strength concentrate. The present arrangement permits greater than four concentrations to be bottled or packaged.

The present arrangement permits replacement of the sugar with an artificial sweetener such as saccharin or sodium saccharin which permits the carbon dioxide to be absorbed in substantial quantities. A 4-strength concentrate sweetened completely with saccharin would be approximately 0.18% by weight of saccharin. This quantity may be reduced if certain modest amounts of sugar are used to provide the sweetening effect.

For example, it may be possible to utilize up to 50% of sugar for the sweetener, whereby the saccharin will constitute only between approximately 0.03% and 0.18%. All percentages are based upon total bottled concentrate by weight.

SUMMARY OF THE INVENTION

Therefore, in accordance with the present invention, an improved aqueous base soft drink concentrate formulation is provided which employs an artificial sweetener selected from the group consisting of saccharin and sodium saccharin, with up to 50% of the sweetening being obtainable from sugar, depending on the strength of the concentrate, balance the artificial sweeteners; and wherein the concentrate formulation is provided with more than one and up to about seven volumes of carbon dioxide per volume of concentrate, normally five plus volumes.

It is a further object of the present invention to provide an improved aqueous base soft drink concentrate formulation which has a capability of receiving and retaining substantial quantities of carbon dioxide.

Other and further objects of the present invention will become apparent to those skilled in the art upon a study of the following specification, appended claims, and accompanying drawing.

DESCRIPTION OF THE PREFERRED EMBODIMENT

Figure 1:
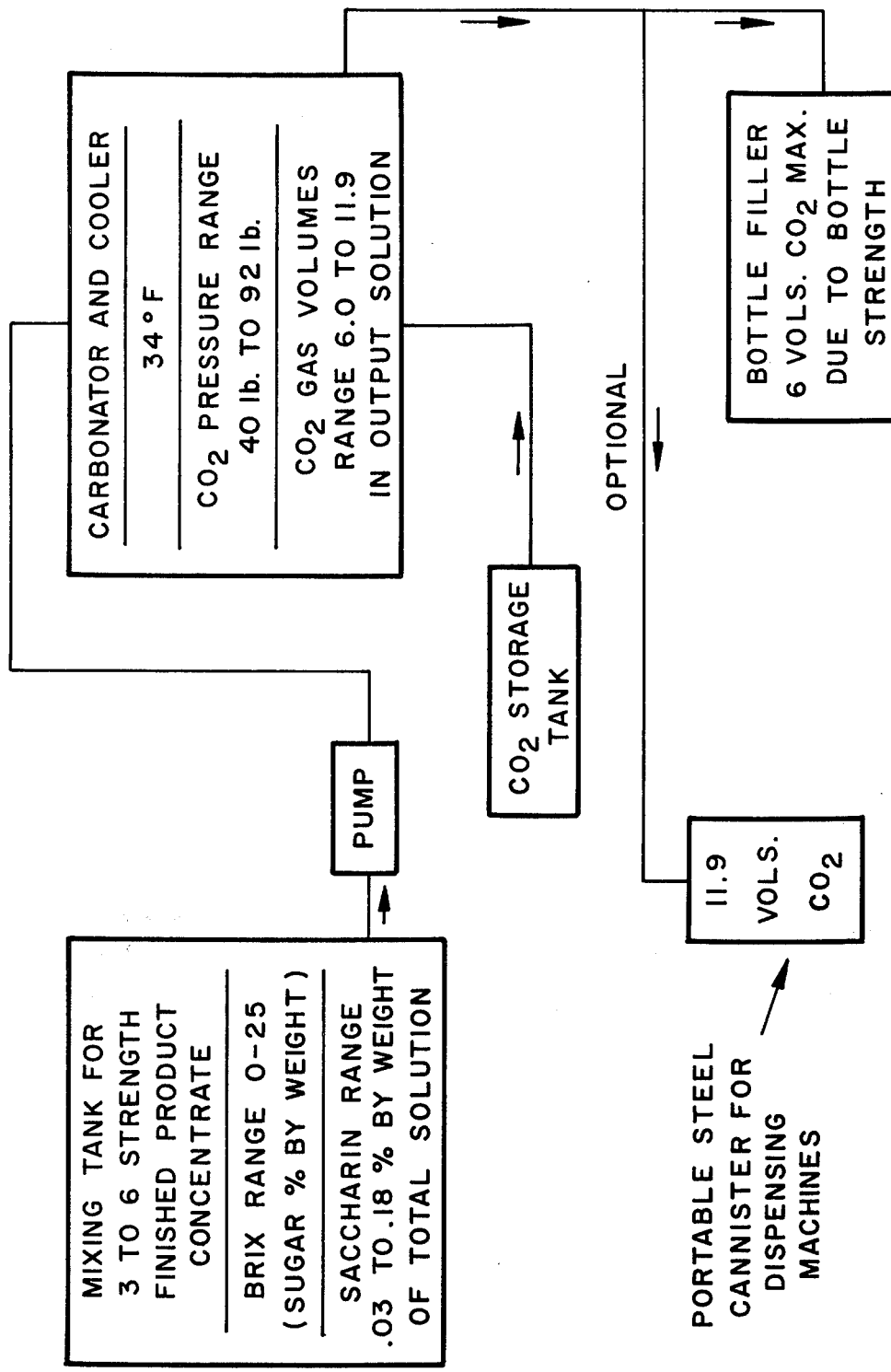
FIG. 1 is a flow diagram of a typical system for preparing soft drink concentrate formulations in accordance with the present invention.

In order to describe the preferred embodiments, the following examples are provided:

EXAMPLE 1

A commercially available soft drink extract is selected, such as, for example, that water-base extract available from Hurty-Peck & Company of Indianapolis, Ind. under their Code Number 37-353. To 1 gallon of the flavor unit, 66 gallons, as recommended, of water is added along with 1 lb. 10 oz. of sodium benzoate. This provides a concentrate which will receive and retain 5 volumes of $CO_2$ per volume of concentrate.

The pH of the finished product is about 3.3.

The flavor unit contains phosphoric acid, artificial flavor and artificial color, sodium saccharin, sodium chloride, sodium gluconate, glucona delta lactone, caffeine, and sodium benzoate as a preservative.

EXAMPLE 2

In order to prepare a black cherry soda concentrate, a commercially available black cherry flavoring extract is selected, this being available from Hurty-Peck & Company of Indianapolis, Indiana under the Code Number 37-579. To the flavor unit, the recommended quantity of water, 61½ gallons, is added, along with 1½ lbs. of sodium benzoate. 3 lbs. 13 oz. of citric acid is also added to the extract. This concentrate is capable of receiving and retaining 5 volumes of $CO_2$ per volume of concentrate, and provides a finished carbonated concentrate having a pH of about 3.6.

The flavor concentrate includes sodium saccharin, sodium chloride, sodium citrate, sodium gluconate, glucona delta lactone, artificial flavor and artificial color, and sodium benzoate as a preservative.

EXAMPLE 3

To the concentrate prepared in Example 1, 19.8 lbs. of sugar are added prior to the introduction of $CO_2$. This provides a concentrate with a modest amount of sugar present for enhancing the sweetener base, with the sugar being approximately 10% of that normally employed in the finished product.

EXAMPLE 4

To the concentrate of Example 2, 10 lbs. of sugar are added to the flavoring extract and water, prior to the introduction of $CO_2$. This provides a product with approximately 5% of the sweetening being available from sugar.

GENERAL CONSIDERATIONS

As is conventional in the art, the flavor concentrates will contain natural or artificial flavor and natural or artificial color, along with the following components in selected quantities:

Sodium saccharin
Saccharin
Sugar
Sodium chloride
Sodium gluconate
Glucona delta lactone
Phosphoric acid
Caffeine
Sodium benzoate
Stannous chloride
Citric acid
Sodium citrate The sweetness is derived from saccharin, sodium saccharin, or sugar, along with some contribution from the sodium gluconate. The pH of the system is controlled by selection of phosphoric acid, citric acid, and sodium citrate, with the citric acid-sodium citrate combination providing a flavoring and buffering combination. Sodium benzoate is added as a preservative, and is normally present in mixtures in a range of about 0.3% or less in the concentrate. In certain instances, other preservatives may be used, although this formulation provides fairly acceptable results.

In the soft drink mix, as distinguished from the concentrate, sufficient sweeteners are employed so as to provide a normal saccharin or combined saccharin-sodium saccharin content of from about 0.03 and 0.04%. Natural sugar for up to 50% of the sweetening requirements may be employed, depending on the strength of the concentrate. This quantity in the concentrate, which is preferably from 0.03% up to about 0.18% of sweetener when saccharin is employed, will retain approximately from greater than one up to seven volumes of carbon dioxide per volume of concentrate. Such a range provides a suitable carbonated soft drink when mixed with from one to five parts of ice water, depending on concentrate strength.

For best results, the concentrate is chilled prior to exposing to the atmosphere, with the concentrate normally being provided in a sealed container for storage purposes.

The system is usable for any of the commonly utilized commercially available soft drink concentrates containing saccharin or sodium saccharin as artificial sweeteners. In addition to the specific examples provided above, a wide variety of drink concentrate formulations may be prepared, such as the following typical examples:

| Parts of Various Strength Concentrate | Parts Water | | Maximum Percent Sugar for Sweetener (in concentrate) |
|---|---|---|---|
| 1 | + 1 | = 2 × | 50% = 100% |
| 1 | + 2 | = 3 × | 33⅓% = 100% |
| 1 | + 3 | = 4 × | 25% = 100% |
| 1 | + 4 | = 5 × | 20% = 100% |
| 1 | + 5 | = 6 × | 16⅔% = 100% |

(Sugar solids concentration same as most soft drinks which can hold five plus volumes $CO_2$). The most practical of the above examples is the one part concentrate, three parts water.

The system is adaptable for use in stainless steel cans for use in a pre-mixed dispensing arrangement wherein the carbon dioxide volume may be increased to as high as 12 volumes. Pre-mixed cans may also be filled with the same advantages as available from glass bottles. Pre-mix cans or post-mix cans filled with 4-strength or 12 gas volumes of semi-concentrate would normally not require a carbonator as in a post-mix system, and would make four times as many drinks per can of premix. Therefore, the arrangement may be utilized in certain instances with a coin or manual automatic dispensing system with water being added.

I claim:

1. In an aqueous base carbonated soft drink concentrate formulation comprising an aqueous solution of a flavoring concentrate based upon natural or artificial color and natural or artificial flavor and flavoring constituents selected from the group consisting of sodium chloride, sodium gluconate, glucona delta lactone, caffeine, phosphoric acid, stannous chloride, citric acid, and sodium citrate; sodium benzoate in a concentration in said soft drink concentrate of about 0.3% by weight based upon total bottled concentrate; wherein:

a. an artificial sweetener is provided selected from the group consisting of saccharin and sodium saccharin in a concentration in said soft drink concentrate ranging from between 0.03% and 0.18% by weight based upon total bottled concentrate, and natural sugar, with from 0% to less than about 50% of the total sweetening requirement being obtained from natural sugar, depending on strength of the concentrate; and b. carbon dioxide in a concentration ranging from greater than one up to seven volumes of carbon dioxide per volume of soft drink concentrate wherein the carbonated concentrate is prepared by introducing the carbon dioxide as a gas directly into the concentrate.

2. The aqueous base carbonated soft drink concentrate as defined in claim 1 being particularly characterized in that said carbon dioxide content is five volumes of carbon dioxide per volume of concentrate.

3. The aqueous base carbonated soft drink concentrate as defined in claim 1 being particularly characterized in that the pH of the concentrate ranges from between 3 and 6.

* * * * *